3,073,158
GAS MASS METERING DEVICE
Berthold A. Knauth, Woodstock, N.Y., assignor, by mesne assignments, to Rotron Manufacturing Co., Inc., Woodstock, N.Y., a corporation of New York
Filed Feb. 9, 1959, Ser. No. 792,161
4 Claims. (Cl. 73—206)

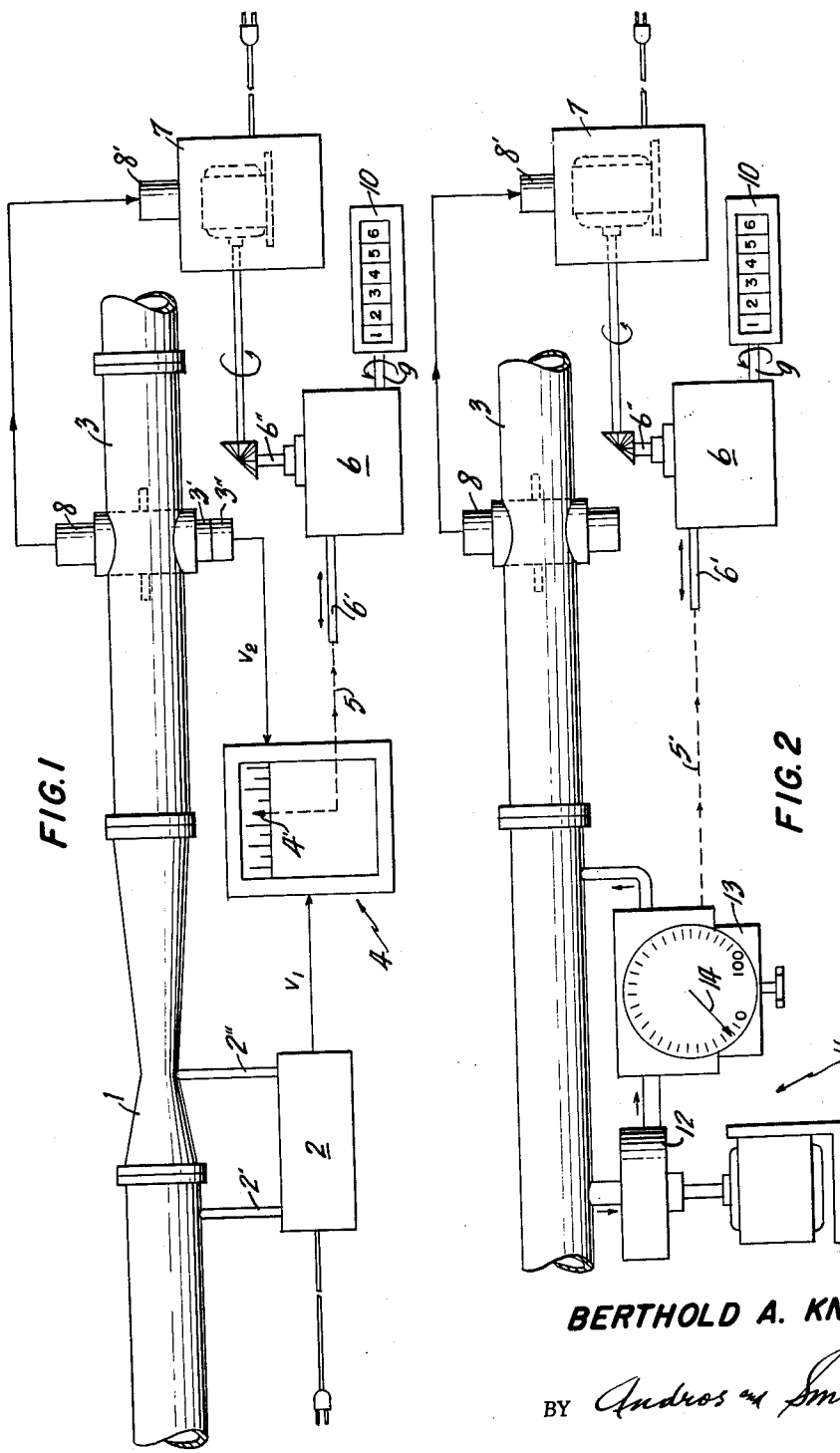

This invention relates to metering devices and particularly to metering devices by which the weight or mass of a compressible fluid that has flowed through the meter will be accurately stated without requiring computation of any kind.

Orifice flowmeters are known by which the volume of gas passing through the meter may be determined, but neither the density nor the weight of gas can be determined without performing extensive computations. The weight especially requires complex computations.

Such computations are not only time consuming, but, since the pressures and temperatures to which the gas in a pipe line are exposed are subject to wide variations, the computations must be repeatedly made. In the natural gas industry, at the present time, each company must employ a staff of personnel to compute and recompute the flow of gas through the pipe lines since the charges for the gas are based on the weight of gas rather than on the volume.

It is a principal object of the present invention to provide a meter that will determine and state the mass of the gas that has flowed through it.

It is a further object of the present invention to provide a meter that will give instantaneous readings of density of the gas and will give a total of the weight of gas that has flowed through the pipe line.

Other and further objects and advantages will appear from the following specification taken with the accompanying drawing in which like characters of reference refer to like elements in the several views and in which:

FIG. 1 is a diagrammatic view of one form of the device; and

FIG. 2 is a diagrammatic view of another form of the device.

The present invention is based on the fact that while there is, at present, no known meter that gives the results set forth above as the objects of invention, there are devices that measure accurately various functions of the items of information required to determine, for instance, the weight of gas flowing through a pipe.

In FIG. 1 a venturi type meter is seen at 1. All the gas that flows through this meter flows also through a "Rotron" vortex-velocity flowmeter 3. This combination of two meters supplies all of the information concerning the gas that is required. The venturi flow meter made by "Foxboro" is suggested for use as meter 1 but any orifice type meter may be substituted in its place.

Now, meter 1 has two connections in the form of tubes 2' and 2" that are open respectively to the gas flow passage before the venturi, and at the throat of the venturi 1. These two tubes lead to a device 2 that measures the differential pressure between tubes 2' and 2". A suggested device for use as element 2 is a differential pressure transducer made by Pace Engineering Co. which produces a voltage proportional to the differential pressure, which voltage may be indicated by $V_1$. Other similar devices that measure the differential pressure may be substituted for this specific item of equipment.

It is well known that the differential pressure $Po$ may be expressed as a function of density J:

$PO = Jk_1v^2$, where $k_1$ is a constant of the particular meter or orifice being used, and $v$ is the velocity.

Flowmeter 3 may be calibrated to read directly in terms of velocity. See my patent application Serial No. 532,187, filed September 2, 1955, now Patent No. 2,906,121, for a discussion of the vortex-velocity meter which is the preferred equipment for use in the present combination manufactured by Rotron Controls Corp., of Woodstock, New York, under the terms of a license granted by me to said corporation.

Since there may be a difference in size between the orifice size of meter 1 and the effective size of meter 3, a suitable constant will need to be used so that the speed of rotation of the vortex wheel or rotor of meter 3 will be calibrated to measure the velocity of the gas through the orifice. Velocity $v$ may be expressed in feet per unit of time to correspond to the velocity in the orifice meter so that the velocity $v$ through the orifice of meter 1 is known directly from meter 3 at any instant, and, from meter 1, we know that, as set forth above, a function of density times the square of the velocity is $Po = k_1Jv^2$.

The weight W of gas per unit of time through the meter 1 must be a function in which the orifice area A is involved and must be (ignoring constants) area A in square feet, times feet per unit of time $v$, times density J.

Since $AJv^2$ times a constant is $Po$ multiplied by constant A, we need only multiply $Po$ by A and divide by $v$, to determine the instantaneous weight per unit of time of gas through the pipe line.

The differential pressure transducer 2, under the influence of the differential pressure will impress a voltage $V_1$ on a wire connecting it to a potentiometer type ratio meter 4 such as may be obtained from "Weston." The voltage impressed is clearly a function of $Jv^2$.

If from meter 3 a single generator 3' were driven, a second voltage $V_2$ would be impressed on a wire leading to the ratiometer 4. A pointer 4' on the ratiometer could then be calibrated to read in weight of gas in lbs. per unit of time. A pen could be mounted to move with pointer 4' to draw a line on a clock-driven paper strip. The total weight for any selected time would, then, be measured by the area of paper between a base line and the pen line. This would still require the integration of the curve to obtain the desired results without computation.

Now, in FIG. 1, instead of only a single generator 3' a second generator 3" is also provided so that the voltage $V_2$ is proportional to $v^2$ rather than to $v$. The pointer 4' then does not give the reading proportional to instantaneous weight but to the instantaneous density J. From differential pressure transducer 2 we derive voltage $V_1$ which expresses $Jv^2$; and from generator 3" we derive voltage $V_2$ which expresses $v^2$; then, dividing $V_1$ by $V_2$, or $Jv^2$ by $v^2$ we obtain J which is density.

The ratiometer 4 then operates by means of a link 5, the carriage moving bar 6' of the integrator 6 that may be the device sold under the name of "Librascope."

As noted above in the vortex-velocity meter 3, the speed of rotation of the rotor of the meter may be calibrated as instantaneous velocity $v$, or, since the area is constant, the absolute number of rotations can equally well be calibrated in terms of volume without respect to time (rotations, times the area equals volume). A synchronous torque amplifier 7, which may be a device sold under the name of "Varotron," is therefore mounted for operation by the vortex-velocity meter 3 by means of a selsyn transmitter 8 and a selsyn receiver 8' and is used to drive in 1:1 ratio (or other selected ratio) the shaft 6" of the integrator 6. The integrator 6 therefor multiplies the density J as adjusted by the link 5 of the ratiometer 4 by the volume indicated by the vortex-velocity meter 3 by way of the synchronous torque amplifier 7. The result is expressed by the absolute revolutions of the integrator shaft 9 to which a revolution counter 10 is drivingly secured. This counter may be one such as is made by "Durant," and is geared as required so that the number shown on its dial is the total weight (expressed in appropriate units) of the gas that has passed through the pipe line.

FIG. 2 shows an alternative form of the device in which a densitometer, indicated generally at 11, is used in lieu of the orifice type meter 1. This meter 11 is the subject of an application Serial No. 792,102 which was filed February 9, 1959, and which now stands abandoned, in which the differential of the pressure built up by a centrifugal type blower, or pump, 12, and the pressure in the pipe line from which the pump takes suction, measures the density J of the gas by means of a pressure differential device 13. The pointer 14 of this device, like the pointer 4' (in FIG. 1) is calibrated in terms of density J and the densitometer 11 moves link 5' in the same manner as link 5 is moved in FIG. 1. The remainder of the device is the same as in FIG. 1 as indicated by similar reference numerals.

It is seen, therefore, that a simple and efficient metering device has been provided that eliminates the necessity of computation, and gives a direct reading of weight of gas that has flowed through the pipe line. It is further seen that a metering arrangement has been devised from which data can be obtained by ancillary equipment to keep a complete record of flow of gas in the pipe line.

Having described my invention, what I claim as new and desire to secure by Letters Patent is:

1. In a metering device for determining the weight of gas flowing in a pipe line, a first meter means to continuously determine the density of a gas flowing through a pipe line by measuring differential pressure as a function thereof and square of the velocity and dividing the former by the latter and second meter means to determine the instantaneous volume of the gas flowing through the pipe line, multiplication means to continuously multiply the instantaneous density derived from said first meter means by the instantaneous volume derived from said second meter means to give the instantaneous weight of gas that has passed through said pipe line, and means driven by said multiplication means to continuously totalize the instantaneous weight of the gas that has flowed through said pipe line.

2. In a metering device for gas the combination of a first metering device of the orifice type including differential pressure measuring means, means operated by said differential pressure measuring means to generate a first voltage proportional to said differential pressure, a second metering device including means that measures the instantaneous velocity through said first metering means, means operated by said second metering device to generate a second voltage proportional to the square of the measured instantaneous velocity, servo motor means, said first and second voltages being operatively connected to said servo means to jointly operate said servo motor means, means on said servo motor means moved by the joint operation of said first and second voltages proportionately to the quotient of said first voltage divided by said second voltage to indicate the density of the gas in said meters, said second metering means also including a shaft rotated by the flow of gas through said second meter at a rate proportional to the instantaneous volume of said gas flowing through said meter, and an integrating device, one element of which is driven at a speed proportional to the speed of rotation of said shaft, the other element of said integrating device being positioned by said servo motor means so that a second shaft of said integrating device will rotate at a rate measuring the weight of gas flowing through the metering device.

3. The device of claim 1 in which the means for determining the density of gas flowing through the pipe comprises an orifice, first means to determine the pressure differential between the pressures on the upstream and downstream sides of the orifice, second means operated by said first means, a first voltage produced by said second means proportional to the differential pressure between the upstream and downstream sides of said orifice, third means operated by the flow of gas through said pipe, a second voltage produced by said third means proportional to the square of the velocity of gas through said orifice, and divider means actuated by said first and second voltages to divide said first voltage by said second voltage to determine the density of the gas flowing through said device.

4. The device of claim 1 in which the differential pressure is determined by a venturi meter and the square of the velocity is determined by a vortex velocity meter.

References Cited in the file of this patent
UNITED STATES PATENTS

| | | |
|---|---|---|
| 1,305,803 | Irwin | June 3, 1919 |
| 2,082,539 | Fischer | June 1, 1937 |
| 2,222,551 | Ziebolz et al. | Nov. 19, 1940 |
| 2,484,207 | Criner et al. | Oct. 11, 1949 |
| 2,772,567 | Boden et al. | Dec. 4, 1956 |